(12) United States Patent
Reitz

(10) Patent No.: US 11,535,096 B2
(45) Date of Patent: Dec. 27, 2022

(54) DRIVE ARRANGEMENT AND MOTOR VEHICLE

(71) Applicant: Schaeffler Technologies AG & Co. KG, Herzogenaurach (DE)

(72) Inventor: Dierk Reitz, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 822 days.

(21) Appl. No.: 16/472,273

(22) PCT Filed: Dec. 12, 2017

(86) PCT No.: PCT/DE2017/101056
§ 371 (c)(1),
(2) Date: Jun. 21, 2019

(87) PCT Pub. No.: WO2018/113832
PCT Pub. Date: Jun. 28, 2018

(65) Prior Publication Data
US 2020/0189382 A1     Jun. 18, 2020

(30) Foreign Application Priority Data
Dec. 21, 2016   (DE) ............... 10 2016 125 071.6

(51) Int. Cl.
*B60K 6/547*     (2007.10)
*B60K 6/24*      (2007.10)
(Continued)

(52) U.S. Cl.
CPC ............. *B60K 6/547* (2013.01); *B60K 6/24* (2013.01); *B60K 6/26* (2013.01); *B60K 6/36* (2013.01);
(Continued)

(58) Field of Classification Search
CPC ... B60K 6/24; B60K 6/26; B60K 6/36; B60K 6/38; B60K 6/547; F16D 21/06
See application file for complete search history.

(56) References Cited

U.S. PATENT DOCUMENTS 9,840,140 B1 *  12/2017  Holmes ................. B60K 6/387
10,549,623 B1 *   2/2020  Park .................... F16H 37/0833
(Continued)

FOREIGN PATENT DOCUMENTS

CN       104290586 B     9/2015
CN       103429450 B     6/2016
(Continued)

*Primary Examiner* — Jeffrey J Restifo

(57) ABSTRACT

A drive arrangement for a motor vehicle comprises an electric driving engine, an internal combustion engine, and a shift transmission having several gears and a multiple clutch. A first transmission element of the shift transmission is coupled in a torque-tight manner to a first rotational part of the multiple clutch and a second transmission element of shift transmission is coupled in a torque-tight manner to a second rotational part of the multiple clutch. A rotor of the electric driving engine is coupled in a torque-tight manner to a third rotational part of the multiple clutch, wherein the internal combustion engine is coupled in a torque-tight manner to a third transmission element of the shift transmission.

11 Claims, 2 Drawing Sheets

(51) Int. Cl.
*B60K 6/26* (2007.10)
*B60K 6/36* (2007.10)
*B60K 6/38* (2007.10)
*F16D 21/06* (2006.01)
*F16H 3/08* (2006.01)
*F16H 3/44* (2006.01)
*F16H 37/04* (2006.01)
*F16H 3/00* (2006.01)

(52) U.S. Cl.
CPC ............... *B60K 6/38* (2013.01); *F16D 21/06* (2013.01); *F16H 3/08* (2013.01); *F16H 3/44* (2013.01); *F16H 37/046* (2013.01); *F16H 2003/008* (2013.01); *F16H 2200/0043* (2013.01); *F16H 2702/04* (2013.01)

(56) References Cited

U.S. PATENT DOCUMENTS

| | | | |
|---|---|---|---|
| 10,774,903 B1 * | 9/2020 | Park | B60K 6/547 |
| 10,780,769 B1 * | 9/2020 | Cho | B60K 6/36 |
| 10,851,875 B1 * | 12/2020 | Park | B60K 6/387 |
| 10,926,623 B1 * | 2/2021 | Park | B60K 6/26 |
| 11,084,370 B1 * | 8/2021 | Park | B60K 6/387 |
| 11,285,799 B1 * | 3/2022 | Cho | F16H 37/065 |
| 11,305,636 B1 * | 4/2022 | Cho | B60K 6/547 |
| 2016/0176280 A1 | 6/2016 | Kaltenbach et al. | |
| 2016/0207389 A1 * | 7/2016 | Yang | B60K 6/48 |
| 2016/0207390 A1 * | 7/2016 | Yang | F16H 3/085 |
| 2016/0207391 A1 * | 7/2016 | Yang | F16H 3/085 |
| 2016/0207392 A1 * | 7/2016 | Zhang | F16H 3/006 |
| 2016/0325728 A1 * | 11/2016 | Yang | B60W 20/14 |
| 2017/0089450 A1 * | 3/2017 | Barone | F16H 57/0441 |
| 2017/0096058 A1 * | 4/2017 | Kanada | F16H 3/728 |
| 2017/0096137 A1 * | 4/2017 | Toyama | B60K 6/48 |
| 2017/0122410 A1 * | 5/2017 | Lee | F16H 3/006 |
| 2017/0122411 A1 * | 5/2017 | Hiraiwa | F16H 3/006 |
| 2017/0274754 A1 * | 9/2017 | Imamura | B60W 10/08 |
| 2017/0305257 A1 * | 10/2017 | Ruan | F16H 3/091 |
| 2017/0305258 A1 * | 10/2017 | Liu | B60K 6/365 |
| 2017/0305260 A1 * | 10/2017 | Ruan | F16H 3/093 |
| 2017/0305430 A1 * | 10/2017 | Kuzuhara | F16H 61/06 |
| 2017/0341502 A1 * | 11/2017 | Scholle | B60K 6/365 |
| 2018/0029461 A1 * | 2/2018 | Choi | B60K 6/48 |
| 2018/0029462 A1 * | 2/2018 | Huh | B60K 6/365 |
| 2018/0065467 A1 * | 3/2018 | Lee | B60K 6/543 |
| 2018/0072309 A1 * | 3/2018 | Iwashita | B60K 6/48 |
| 2018/0073593 A1 * | 3/2018 | Kawamura | F16F 15/13121 |
| 2018/0111471 A1 * | 4/2018 | Lee | F16H 37/042 |
| 2018/0112742 A1 * | 4/2018 | Lee | F16H 3/093 |
| 2018/0112743 A1 * | 4/2018 | Lee | F16H 3/093 |
| 2018/0112745 A1 * | 4/2018 | Lee | F16H 3/093 |
| 2018/0154757 A1 * | 6/2018 | Lee | F16H 37/04 |
| 2019/0118635 A1 * | 4/2019 | Hwang | F16H 3/0915 |
| 2019/0118642 A1 * | 4/2019 | Cho | F16H 3/093 |
| 2019/0120342 A1 * | 4/2019 | Hwang | F16H 3/78 |
| 2019/0120351 A1 * | 4/2019 | Cho | F16H 37/046 |
| 2019/0225068 A1 * | 7/2019 | Liu | F16H 3/006 |
| 2019/0263246 A1 * | 8/2019 | Hummel | B60K 6/36 |
| 2019/0315220 A1 * | 10/2019 | Liu | B60K 6/547 |
| 2019/0316654 A1 * | 10/2019 | Liu | B60K 6/36 |
| 2020/0039342 A1 * | 2/2020 | Park | F16H 3/006 |
| 2020/0047601 A1 * | 2/2020 | Park | F16H 37/0833 |
| 2020/0047603 A1 * | 2/2020 | Park | F16H 3/093 |
| 2020/0063829 A1 * | 2/2020 | Jang | F16H 3/724 |
| 2020/0063830 A1 * | 2/2020 | Jang | F16H 3/006 |
| 2020/0063835 A1 * | 2/2020 | Hwang | F16H 3/54 |
| 2020/0148054 A1 * | 5/2020 | Hummel | B60K 6/36 |
| 2020/0189381 A1 * | 6/2020 | Oshiumi | B60K 30/18109 |
| 2020/0207327 A1 * | 7/2020 | Imamura | B60W 10/115 |
| 2020/0223427 A1 * | 7/2020 | Shimura | B60K 6/28 |
| 2020/0231030 A1 * | 7/2020 | Hummel | B60K 6/547 |
| 2020/0353809 A1 * | 11/2020 | Park | F16H 37/046 |
| 2020/0355266 A1 * | 11/2020 | Park | F16H 37/06 |
| 2020/0391720 A1 * | 12/2020 | Isami | B60W 10/08 |
| 2021/0016651 A1 * | 1/2021 | Cho | B60K 6/365 |
| 2021/0016652 A1 * | 1/2021 | Qiu | B60K 6/365 |
| 2021/0023931 A1 * | 1/2021 | Hwang | F16H 3/085 |
| 2021/0188251 A1 * | 6/2021 | Inoue | B60W 10/08 |
| 2021/0206256 A1 * | 7/2021 | Hwang | B60K 6/387 |
| 2021/0207688 A1 * | 7/2021 | Hwang | B60K 6/387 |
| 2021/0222757 A1 * | 7/2021 | Ebuchi | F16H 63/30 |
| 2021/0260985 A1 * | 8/2021 | Park | F16H 3/093 |
| 2021/0284006 A1 * | 9/2021 | Park | F16H 3/006 |
| 2021/0293310 A1 * | 9/2021 | Park | B60K 6/547 |
| 2021/0309204 A1 * | 10/2021 | Isami | B60K 6/387 |
| 2021/0354544 A1 * | 11/2021 | Zhao | B60W 10/06 |
| 2021/0370910 A1 * | 12/2021 | Ebuchi | B60K 6/445 |
| 2022/0009339 A1 * | 1/2022 | De Visscher | B60W 30/18027 |
| 2022/0041045 A1 * | 2/2022 | Rinderknecht | B60K 6/36 |
| 2022/0041156 A1 * | 2/2022 | Imamura | B60W 30/1882 |
| 2022/0126673 A1 * | 4/2022 | Beck | B60K 6/547 |
| 2022/0126676 A1 * | 4/2022 | Beck | B60K 6/48 |
| 2022/0134863 A1 * | 5/2022 | Beck | F16H 3/089 180/65.21 |
| 2022/0134865 A1 * | 5/2022 | Beck | B60K 6/36 74/325 |
| 2022/0136589 A1 * | 5/2022 | Beck | F16H 3/089 74/325 |

FOREIGN PATENT DOCUMENTS

| | | |
|---|---|---|
| CN | 103836126 B | 6/2016 |
| CN | 207128607 U | 3/2018 |
| CN | 208134080 U | 11/2018 |
| DE | 10057798 A1 | 5/2002 |
| DE | 102007043173 A1 | 5/2008 |
| DE | 102007050414 A1 | 5/2008 |
| DE | 102009038344 A1 | 2/2011 |
| DE | 102011116935 A1 | 5/2013 |
| DE | 102013206176 A1 | 10/2014 |
| DE | 102013210013 A1 | 12/2014 |
| EP | 2287487 A1 | 2/2011 |
| KR | 1020050064953 A | 6/2005 |
| WO | 2014166745 A1 | 10/2014 |
| WO | 2017220547 A1 | 12/2017 |

* cited by examiner

DRIVE ARRANGEMENT AND MOTOR VEHICLE

CROSS-REFERENCE TO RELATED APPLICATIONS

This application is the U.S. National Phase of PCT Appln. No. PCT/DE2017/101056 filed Dec. 12, 2017, which claims priority to DE 102016125071.6 filed Dec. 21, 2016, the entire disclosures of which are incorporated by reference herein.

TECHNICAL FIELD

The present disclosure relates to a drive arrangement for a motor vehicle as well as the motor vehicle itself.

BACKGROUND

In view of the necessity of improving the environmental sustainability of vehicles, there are various approaches in terms of the at least partial electrification of vehicles.

One of these approaches lies in what is known as the plug-in-hybrid which is a motor vehicle with an electromotive and combustion drive, the accumulator of which can be charged both via the internal combustion engine and on the power grid.

The hybrid module VW DQ400 from Volkswagen AG represents an almost optimal ratio between energy consumption, low-cost manufacture, installation space requirement, ease of shifting as well as service life.

There is represented in DE 10 2009 038 344 A1 a drivetrain module for a motor vehicle which has an electric driving engine, an internal combustion engine as well as a shift transmission which has several gears and a dual clutch as well as a separating clutch. The separating clutch embodied as a rotor clutch serves to transmit a torque from a module input shaft to the dual clutch.

However, a further reduction in terms of manufacturing costs is desired in comparison with such a hybrid module.

SUMMARY

The object on which the present disclosure is based is therefore to make available a drive arrangement for a motor vehicle which combines low energy consumption and installation requirements with a high degree of ease of shifting as well as a long service life alongside low-cost manufacture.

The present disclosure relates to a drive arrangement for a motor vehicle, comprising an electric driving engine, an internal combustion engine as well as a shift transmission having several gears and a multiple clutch, in particular a dual clutch. A first transmission element of the shift transmission, in particular a first gear wheel or a first gear wheel pair, is coupled in a torque-tight manner to a first rotational part of the multiple clutch and a second transmission element of the shift transmission, in particular a second gear wheel or a second gear wheel pair, is coupled in a torque-tight manner to a second rotational part of the multiple clutch. A rotor of the electric driving engine is coupled in a torque-tight manner to a third rotational part of the multiple clutch. The internal combustion engine is coupled in a torque-tight manner to a third transmission element, in particular a third gear wheel, of the shift transmission.

A respective transmission element or gear wheel forms together with a further gear wheel a transmission stage and thus a gear of the shift transmission. The respective transmission element can also have two gear wheels which are coupled to one another in a rotationally fixed manner and thus a gear wheel pair which form a transmission stage in each case during cogging with further gear wheels.

Due to the fact that the internal combustion engine is connected directly and preferably without interpositioning of a separating clutch to the shift transmission via a transmission stage, the internal combustion engine as well as the electric driving engine can be configured for different rotational speed or torque ranges so that a minimization of the installation space required for the drivetrain can be realized.

The present disclosure does not, however, necessarily have to be embodied without a separating clutch between the internal combustion engine and the shift transmission.

The present disclosure thus represents what is known as an integrated hybrid transmission, wherein the shift transmission is preferably an automated transmission and the multiple clutch is embodied as a wet dual clutch. It is expedient here that the electric driving engine is the main drive and the internal combustion engine is an optionally actuable auxiliary drive.

It is preferably provided that the third transmission element, to which the internal combustion engine is coupled, is a gear wheel in order to realize the transmission ratio of the 4th gear of the shift transmission.

As a result of this mechanical coupling of the internal combustion engine via a toothing, in particular via a spur gear toothing, to the shift transmission, the torque input by the internal combustion engine and the rotational speed can be determined in regions by the selected transmission ratio between internal combustion engine and the transmission element of the shift transmission.

In this configuration, it is expedient that the gear wheel which serves as the third transmission element is the drive wheel of the transmission ratio of the $4^{th}$ gear of the shift transmission.

The coupling of the internal combustion engine to the third transmission element can furthermore be realized via a freewheel, a shiftable sliding sleeve, or a differential transmission.

Starting of the internal combustion engine is carried out in the case of a connection via a freewheel by an additional starter, or in the case of a connection via a sliding sleeve via the second separating clutch, which is operated with slip, of the dual clutch.

In order to also be able to carry this out in the case of the maximum speed realized by the electric machine, the gear which realizes the maximum speed is an odd gear.

The drive arrangement according to the present disclosure is furthermore configured to be advantageous if the first rotational part is a first clutch disk of the multiple clutch and the second rotational part is a second clutch disk of the multiple clutch.

The third rotational part should then be a clutch housing of the multiple clutch.

The clutch disks are rotatable relative to the clutch housing in the case of an open clutch and fixed rotationally in relation to one another in the case of a closed clutch so that a torque can be transmitted between them in the case of a closed sub-clutch. Torque can be transmitted shiftably in such a manner between the clutch disks and the clutch housing or the elements of the drivetrain connected thereto.

It is furthermore provided in one advantageous configuration that the multiple clutch is arranged at least in regions and preferably entirely in the space enclosed by the rotor of the electric driving engine. This ensures a further reduction in the installation space required in particular since, according to the present disclosure, a separating clutch between the internal combustion engine and the shift transmission can be omitted.

The shift transmission can furthermore comprise a planetary gear transmission which can be in particular a planetary gear transmission with a shiftable internal gear, wherein the planetary gear transmission is arranged for the realization of a further transmission ratio between transmission elements. The shiftable internal gear serves here in particular to spread the transmission ratio which can be realized by the planetary gear transmission.

It is furthermore advantageously provided that the shift transmission is a dual clutch transmission and the multiple clutch is a dual clutch, wherein a first output shaft of the dual clutch transmission is coupled rotationally to the first rotational part of the dual clutch, and a second output shaft of the dual clutch transmission is coupled rotationally to the second rotational part of the dual clutch. Such a rotational coupling is preferably provided in such a manner here that the respective rotational part or clutch disk is connected via at least one transmission stage of the transmission to the respective output shaft.

In contrast to conventional drive arrangements, the drive arrangement according to the present disclosure is configured in such a manner that separating clutch KO normally provided on the motor is omitted. The electric machine can then be configured as a high rpm assembly which has an advantageous effect on driving comfort and production costs. The shift transmission can correspondingly also be configured for high rotational speeds and relatively low bearing torques so that the shift transmission can also be made available at low cost.

All hybrid functions can be realized. A vehicle fitted with the drive arrangement can be driven in all gears of the shift transmission both by internal combustion engine and electrically, wherein all the gears can be shifted with load switching.

A motor vehicle is furthermore additionally made available which has a drive arrangement according to the present disclosure and at least one drive wheel which can be driven by means of the drive arrangement. The drive arrangement according to the present disclosure is preferably arranged in a front wheel drive car.

BRIEF DESCRIPTION OF THE DRAWINGS

The present disclosure described above is explained in detail below against the relevant technical background with reference to the associated drawings which show preferred configurations. The present disclosure is in no way restricted by the purely schematic drawings, wherein it should be noted that the exemplary embodiments shown in the drawings are not restricted to the represented dimensions. In the drawings.

DETAILED DESCRIPTION

In the drive arrangement proposed here, a corresponding optimal transmission ratio can be realized by the mechanical connection of the internal combustion engine via a transmission element. The rotational speeds realized by the electric machine and the internal combustion engine can be adjusted independently of one another. No extra separating clutch is required to couple on the internal combustion engine, as a result of which the technical production outlay is reduced and installation space can additionally be made available.

Figure 2:
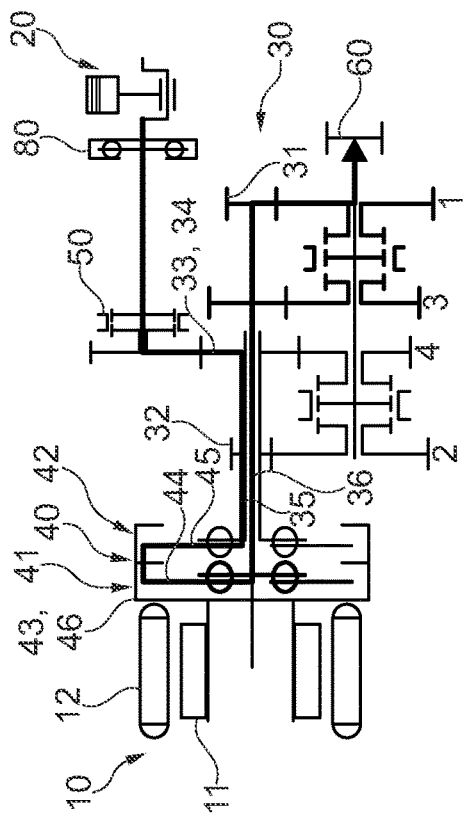
FIG. 2: shows a drive arrangement according to the present disclosure with connected internal combustion engine with illustration of the torque path in the $1^{st}$ gear.
Figure 1:
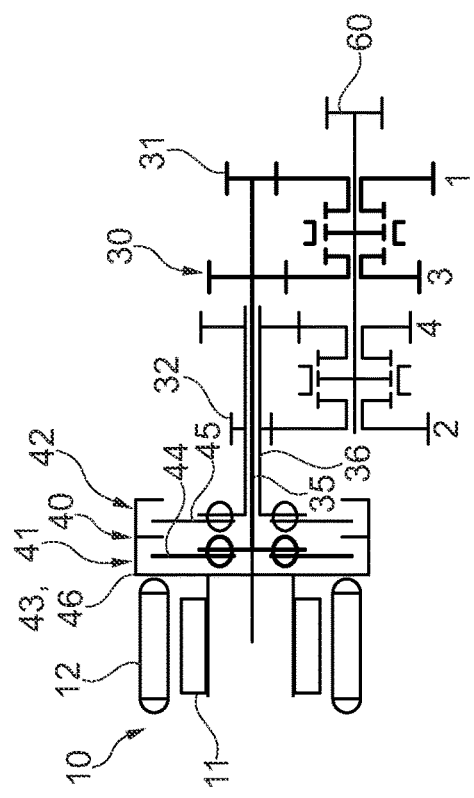
FIG. 1: shows a conventional drive arrangement with electric driving engine and without internal combustion engine.

The fundamental structure of a drive arrangement according to the present disclosure is initially explained on the basis of FIGS. 1 and 2. FIG. 1 shows a drive arrangement with connected electric driving engine 10 to which no internal combustion engine is yet connected. This drive arrangement comprises, in addition to electric driving machine 10, a shift transmission 30 as well as a multiple clutch 40 embodied here as a dual clutch. The torque generated by electric driving engine 10 is conducted via multiple clutch 40 and shift transmission 30 to output 60.

Shift transmission 30 has several transmission stages for the realization of gears 1-4. Gear wheels of gears 1 and 3 are coupled as first transmission elements 31 to a first output shaft 35, and the gear wheels of gears 2 and 4 are coupled as second transmission elements 32 to a second output shaft 36.

First output shaft 35 can be connected in a torque-tight manner to a first rotational part 44 of multiple clutch 40 by a coupling process, and second output shaft 36 can be connected in a torque-tight manner to a second rotational part 45 of multiple clutch 40 by a coupling process. Here, first rotational part 44 is the clutch disk of first sub-clutch 41, and second rotational part 45 is the clutch disk of second sub-clutch 42 of multiple clutch 40.

These clutch disks are rotatable relative to clutch housing 43 of multiple clutch 40. Clutch housing 43 forms a third rotational part 46 of multiple clutch 40 which is connected fixedly to rotor 11 of electric driving engine 10.

In the event of rotation of rotor 11 in relation to stator 12 of electric driving engine 10, the path of the transmitted torque through shift transmission 30 can thus be determined by closing sub-clutches 41,42, namely either via the transmission ratios of the $1^{st}$ or $3^{rd}$ gear or via the transmission ratios of the $2^{nd}$ and $4^{th}$ gear.

FIG. 2 shows the embodiment represented in FIG. 1 of a drive arrangement with internal combustion engine 20 coupled thereon. Internal combustion engine 20 is connected via a centrifugal pendulum 80 to shift transmission 30. Here, no further separating clutch is arranged between internal combustion engine 20 and shift transmission 30, rather internal combustion engine 20 is connected thereto via a third transmission element 33, which here is also the drive wheel of the transmission ratio of the $4^{th}$ gear of shift transmission 30. There are a wide range of possibilities for the use of internal combustion engines of varying capacities as a result of the selection of the transmission ratio of the transmission ratio realized with this third transmission element 33. It is thus possible, among other things, to arrange relatively high rpm internal combustion engines 20 which require a small amount of installation space.

FIG. 2 furthermore shows the torque path during operation of the drive arrangement by means of internal combustion engine 20. It is apparent that the torque made available by internal combustion engine 20 is input via drive wheel 34 of the transmission ratio for the $4^{th}$ gear of shift transmission 30 into shift transmission 30 and via second output shaft 36 to second sub-clutch 42, from this to clutch housing 43 and from this to first sub-clutch 41. The torque is conducted from first sub-clutch 41 into first output shaft 35 and is made available from there via the transmission ratio of the $1^{st}$ gear to output 60.

Figure 4:
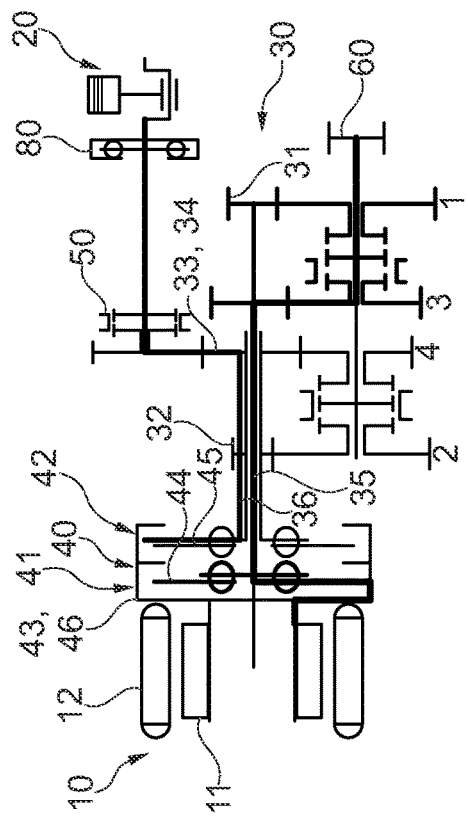
FIG. 4: shows a drive arrangement according to the present disclosure with connected internal combustion engine with illustration of the starting process of the internal combustion engine.
Figure 3:
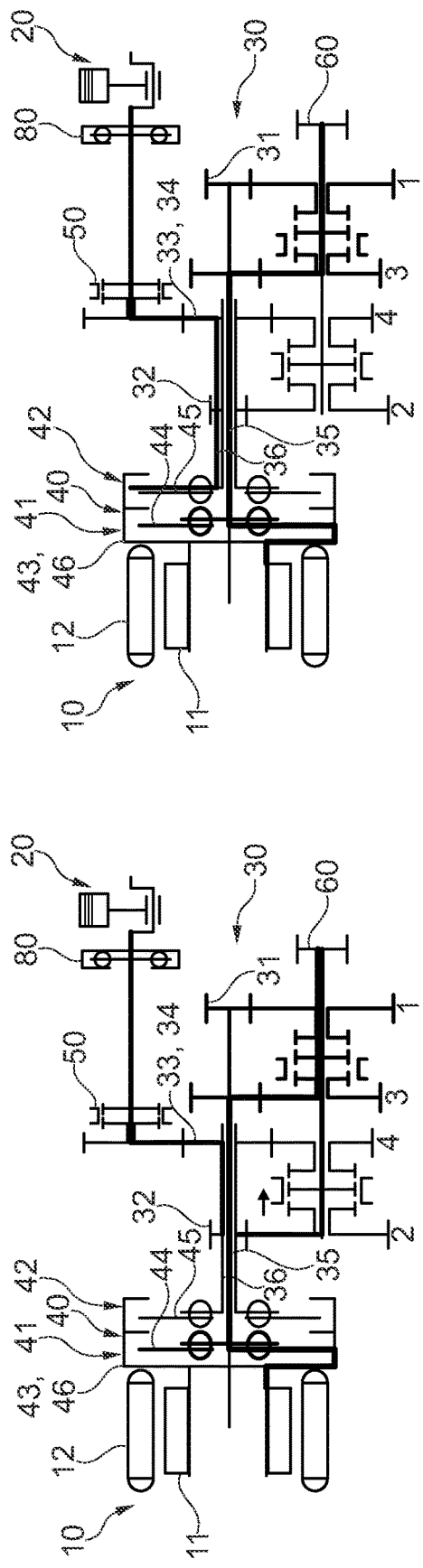
FIG. 3: shows a drive arrangement according to the present disclosure with connected internal combustion engine with illustration of the shifting process from the $2^{nd}$ to the $3^{rd}$ gear.

FIGS. 3 and 4 show the same drive arrangement as FIG. 2, but with different functions. FIG. 3 shows the procedure of the shifting process from the 2nd to the 3rd gear. It is apparent that the torque made available by internal combustion engine 20 is initially conducted via the transmission ratio of the 4th gear and from there via second output shaft 36 to output 60. By activating first sub-clutch 41 and by operating first electric driving engine 10, a torque is input from rotor 11 via first sub-clutch 41 into first output shaft 35 and conducted from this via the transmission stage of the $3^{rd}$ gear to output 60. In this state, electromotive drive is thus carried out so that internal combustion engine 20 does not have to be operated.

The shifts between the gears are always carried out as a load shift of electric driving engine 10; internal combustion engine 20 is uncoupled prior to shifting or only coupled on again after the load shift.

In order to restart internal combustion engine 20 from the described $3^{rd}$ gear, one can proceed as apparent from FIG. 4. In this case, second sub-clutch 42 is closed so that torque is transmitted to second output shaft 36 and conducted from there via drive wheel 34 to internal combustion engine 20 so that it can be started.

Figure 5:
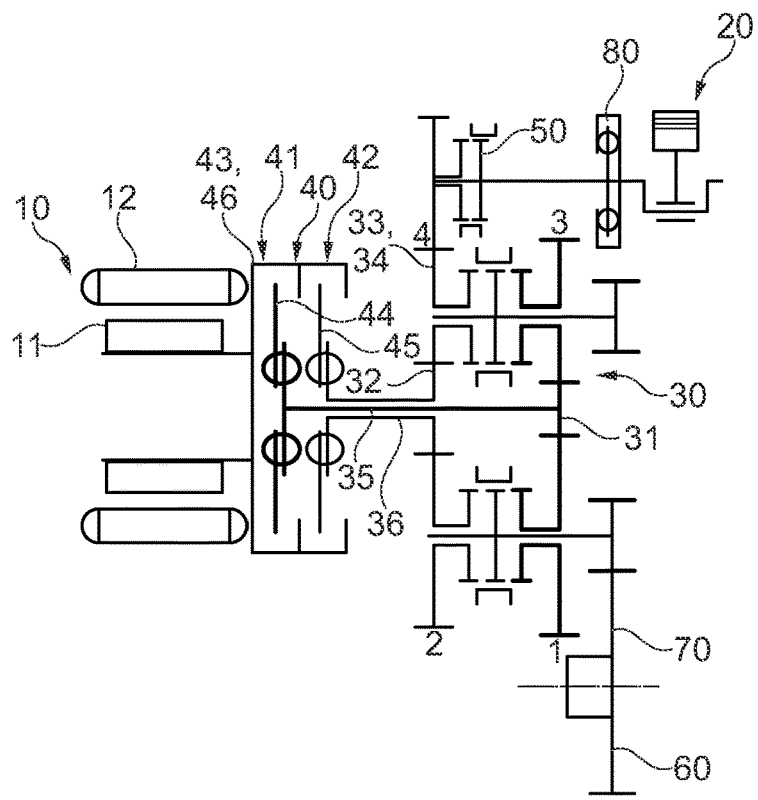
FIG. 5: shows a further embodiment of a drive arrangement according to the present disclosure with connected internal combustion engine with differential transmission.
Figure 6:
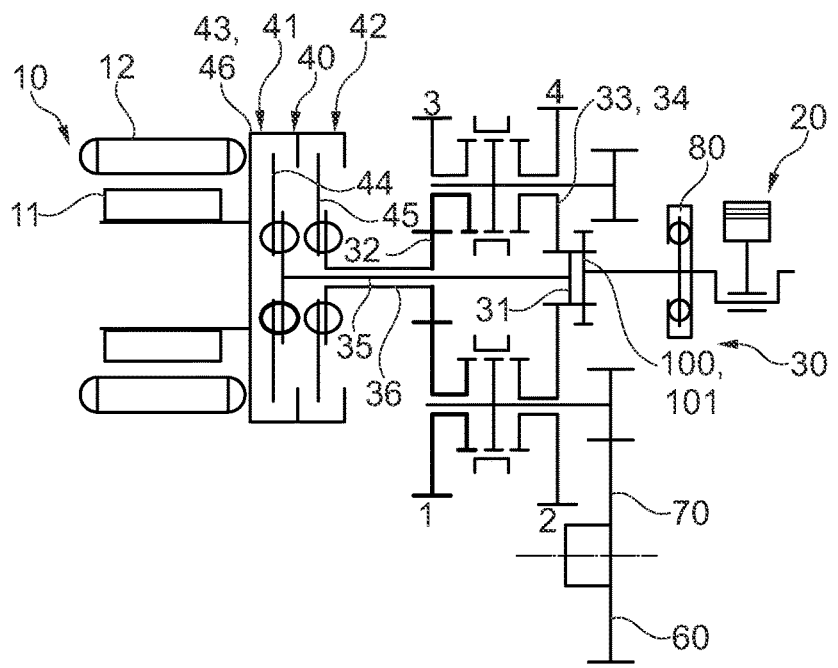
FIG. 6: shows a further embodiment of a drive arrangement according to the present disclosure with connected internal combustion engine with planetary gear transmission.

FIGS. 5 and 6 show configurations of the drive arrangement according to the present disclosure, in the case of which shift transmission 30 is coupled to a differential transmission 70. It is furthermore apparent that internal combustion engine 20 in the embodiment represented in FIG. 5 of the drive arrangement is connected via a freewheel 50 to shift transmission 30. In the embodiment represented in FIG. 6, the connection of internal combustion engine 20 to shift transmission 30 is realized via a planetary gear transmission 100 which preferably has a shiftable internal gear 101 for adjustment of the torque ratios.

A corresponding optimum transmission ratio can be realized by the mechanical connection of the internal combustion engine via a transmission element. The rotational speeds realized by the electric machine and the internal combustion engine can be adjusted independently of one another. No extra separating clutch is required to couple on the internal combustion engine, as a result of which the technical production outlay is reduced and installation space can additionally be made available.

LIST OF REFERENCE NUMBERS

1 First gear
2 Second gear
3 Third gear
4 Fourth gear
10 Electric driving engine
11 Rotor
12 Stator
20 Internal combustion engine
30 Shift transmission
31 First transmission element
32 Second transmission element
33 Third transmission element
34 Drive wheel
35 First output shaft
36 Second output shaft
40 Multiple clutch
41 First sub-clutch
42 Second sub-clutch
43 Clutch housing
44 First rotational part
45 Second rotational part
46 Third rotational part
50 Freewheel
60 Output
70 Differential transmission
80 Centrifugal pendulum
100 Planetary gear transmission
101 Shiftable ring gear

The invention claimed is:

1. A drive arrangement for a motor vehicle, comprising an electric driving engine, an internal combustion engine, and a shift transmission having several gears and a multiple clutch, wherein a first transmission element of the shift transmission is coupled in a torque-tight manner to a first rotational part of the multiple clutch and a second transmission element of the shift transmission is coupled in a torque-tight manner to a second rotational part of the multiple clutch, and a rotor of the electric driving engine is coupled in a torque-tight manner to a third rotational part of the multiple clutch, wherein the internal combustion engine is coupled in a torque-tight manner to a third transmission element of the shift transmission, and wherein the third rotational part is a clutch housing of the multiple clutch.

2. The drive arrangement as claimed in claim 1, wherein the third transmission element, to which the internal combustion engine is coupled, is a gear wheel to realize a transmission ratio of a $4^{th}$ gear of the shift transmission.

3. The drive arrangement as claimed in claim 2, wherein the gear wheel which serves as the third transmission element is a drive wheel of the transmission ratio of the $4^{th}$ gear of the shift transmission.

4. The drive arrangement as claimed in claim 1, wherein the internal combustion engine is coupled to the third transmission element via
  a freewheel,
  a shiftable sliding sleeve, or
  a differential transmission.

5. The drive arrangement as claimed in claim 1, wherein the first rotational part is a first clutch disk of the multiple clutch, and the second rotational part is a second clutch disk of the multiple clutch.

6. The drive arrangement as claimed in claim 1, wherein the multiple clutch is arranged in a space enclosed by the rotor of the electric driving engine.

7. The drive arrangement as claimed in claim 1, wherein the shift transmission comprises a planetary gear transmission with a shiftable ring gear, wherein the planetary gear transmission is arranged between transmission elements for a realization of a further transmission ratio.

8. The drive arrangement as claimed in claim 1, wherein the shift transmission is a dual clutch transmission and the multiple clutch is a dual clutch, wherein a first output shaft of the dual clutch transmission is rotationally coupled to the first rotational part of the dual clutch, and a second output shaft of the dual clutch transmission is rotationally coupled to the second rotational part of the dual clutch.

9. A motor vehicle, having a drive arrangement as claimed in claim 1 and at least one drive wheel which can be driven by the drive arrangement.

10. The drive arrangement as claimed in claim 1, wherein the multiple clutch is a dual clutch.

11. The drive arrangement as claimed in claim 1, wherein:
the first transmission element of the shift transmission is a first gear wheel or a first gear wheel pair;
the second transmission element of shift transmission is a second gear wheel or a second gear wheel pair; and
the third transmission element is a third gear wheel.

* * * * *